(12) United States Patent
Sommer et al.

(10) Patent No.: US 7,029,409 B2
(45) Date of Patent: Apr. 18, 2006

(54) HYDRAULIC SYSTEM FOR A CVT-TRANSMISSION OF A VEHICLE

(75) Inventors: Stefan Sommer, Saulgau (DE); Andreas Piepenbrink, Grünwald (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 31 days.

(21) Appl. No.: 10/247,320

(22) Filed: Sep. 19, 2002

(65) Prior Publication Data
US 2003/0060313 A1 Mar. 27, 2003

(30) Foreign Application Priority Data
Sep. 24, 2001 (DE) .............................. 101 46 962

(51) Int. Cl.
*F16H 59/00* (2006.01)

(52) U.S. Cl. .................................. 474/28; 474/18

(58) Field of Classification Search .................. 474/18, 474/28, 45, 69
See application file for complete search history.

(56) References Cited

U.S. PATENT DOCUMENTS

| | | | |
|---|---|---|---|
| 6,299,564 B1 * | 10/2001 | Gessler et al. | 474/28 |
| 6,336,880 B1 * | 1/2002 | Agner | 474/28 |
| 6,350,215 B1 | 2/2002 | Gierling | 475/159 |

FOREIGN PATENT DOCUMENTS

| | | |
|---|---|---|
| DE | 199 04 593 A1 | 8/2000 |
| DE | 199 06 558 A1 | 9/2000 |
| DE | 199 34 598 A1 | 2/2001 |
| EP | 0 228 817 B1 | 6/1990 |

* cited by examiner

*Primary Examiner*—David Fenstermacher
(74) *Attorney, Agent, or Firm*—Davis & Bujold, P.L.L.C.

(57) ABSTRACT

A hydraulic system of a CVT transmission of a motor vehicle is proposed, which has an oil pump for conveying oil from an oil sump to a variator comprising a first pulley set and a second pulley set. In each case, a valve mechanism is provided for controlling a pressure acting on the pulley set concerned. Between the valve mechanisms associated with the respective pulley sets is arranged a pressure selector valve, whose position determines which of the the valve mechanisms controls a main pressure to be delivered by the oil pump.

12 Claims, 1 Drawing Sheet

HYDRAULIC SYSTEM FOR A CVT-TRANSMISSION OF A VEHICLE

FIELD OF THE INVENTION

The invention concerns a hydraulic system of a CVT transmission of a vehicle, comprising an oil pump for delivering oil from an oil sump to a variator with a first set of pulleys and a second set of pulleys, with a valve mechanism in each case for the adjustment of a pressure on the pulley set concerned.

BACKGROUND OF THE INVENTION

A CVT (Continuously Variable Transmission) automatic transmission of the type described at the start is generally known from practice. Such an automatic transmission, also known as a belt transmission, commonly comprises a variator for the continuous adjustment of a transmission ratio, which comprises a first conical pulley set, known as the primary pulley set, on a drive input shaft or primary shaft, and a second conical pulley set, known as the secondary pulley set, on a drive output shaft or secondary shaft. Each pair of conical pulleys consists of a first pulley fixed in the axial direction and a second pulley that can move in the axial direction, which is called the primary pulley or the secondary pulley depending on whether it is associated with the primary or the secondary pulley set. Between these pulley pairs there runs a torque transmission element which, for example, can be a thrust jointed band.

To displace the primary or the secondary pulley, these are acted upon by a pressure medium from a pressure source, and in each case the pressure acting on the pulley sets or on the regulating volume of the axially movable pulleys is adjusted with the aid of an electronic transmission control and an electro-hydraulic pressure delivery device.

From industrial practice hydraulic systems for the control of a CVT automatic transmission are known, in which the pressure on the primary pulley set is limited to the maximum pressure exerted on the secondary pulley set, which as a rule determines the contact pressure. The value controlling the pressure on the secondary pulley set then at the same time controls the main pressure to be supplied by the oil pump.

For reliable transmission at the primary and secondary pulley sets, there must be a guaranteed pressure at every operating point in both adjustment pulleys. To move the variator in the overdrive direction, i.e. when "changing up", the primary pulley set must be acted upon by a certain pressure. In this, the pressure level influences the shift speed of the variator and is therefore determined by the operating point characteristics of the driving strategy.

However, when the secondary valve that controls the secondary pulley set determines the main pressure, the pressure on the primary pulley set can only be lower or the same size. This limitation, namely that the primary pulley set pressure can be made at most equal to the secondary pulley set pressure, places a restriction on the pulley area ratio of the primary and secondary pulleys, such that the said ratio must correspond at least to the maximum supporting force ratio of the variator. In this, high contact forces on the primary pulley can only be achieved if the primary pulley has a substantially larger diameter than the secondary pulley, which is unfavorable in relation to the restricted structural space situation.

DE 199 06 558 shows a hydraulic system for the control of a CVT automatic transmission, which differs from the above in comprising a separate main pressure valve control system. By virtue of a main pressure control system with a separate main pressure valve and all the associated pressure regulator chains and a pressure sensor, the above described limitation of the pressure on the primary pulley set to the maximum pressure of the secondary pulley set can be overcome.

Disadvantages of this solution, however, are the cost entailed for the pressure regulator and perhaps pressure sensor, and the dependence on pressure regulator and pressure sensor tolerances of the supply pressure offset adjusted in accordance with the software. The tolerances of the pressure regulators and sensors used act additively on the primary and secondary sides, so that the minimum possible offset is not always achieved.

The purpose of the present invention is, therefore, to provide a hydraulic system of a CVT transmission of a motor vehicle, with which the pressure of the variator can be controlled reliably with the simplest possible means and with which a geometrically favorable pulley ratio is possible.

According to the invention, this objective is achieved with a hydraulic system having the characteristics of claim 1.

SUMMARY OF THE INVENTION

In that a pressure selector valve is arranged between the valve mechanisms associated with the respective pulley sets, and the position of the said pressure selector valve determines which of these valve mechanisms adjusts a main pressure to be delivered by the oil pump, the restriction upon the pressurizing of the pulley sets as a function of the respective other pulley set can be advantageously overcome without recourse to an expensive main pressure control system with additional active elements and sensors.

In a simple embodiment, the pressure selector valve can be made with a slide-valve structure such that a connection between a line leading to the oil delivery pump and to the valve mechanism that controls the pressure on the first pulley set, and a line leading to the valve mechanism that controls the pressure on the second pulley set, can be opened and closed by a valve piston connected at one end via a throttle to the line leading to the oil pump and the valve mechanism of the first pulley set, while its other end is acted on by the pressure of a spring and by the pressure acting on the first pulley set.

Accordingly, the hydraulic system of the invention can easily be integrated into existing hydraulic systems, such that their pulley set controls including any emergency program logic present can in most cases be retained.

In an advantageous embodiment of the hydraulic system according to the invention, the main pressure can be adjusted in such manner that it corresponds to the pressure on the secondary pulley set when that pressure is higher than or equal to the pressure on the primary pulley set plus an offset value.

In this case the pressure acting on the secondary pulley set can be adjusted as the main pressure by means of the valve mechanism associated with the secondary pulley set.

In the case when the pressure on the secondary pulley set is smaller than the pressure on the primary pulley set plus an offset value, the main pressure can be adjusted to the latter pressure with the aid of the pressure selector valve.

In all cases the hydraulic system according to the invention allows a marked reduction of the geometrical pulley ratio.

In this respect the hydraulic system according to the invention also proves advantageous in that a hydraulically constant offset without large tolerances can be defined and maintained.

In relation to the arrangement of the pressure selector valve, it is advantageous to arrange this between the valve mechanism constituting a primary valve for adjustment of the pressure acting on the primary pulley set and the valve mechanism constituting a secondary valve for adjustment of the pressure acting on the secondary pulley set, in such manner that the main pressure corresponding to the secondary pressure is controlled by the secondary valve alone, while the main pressure corresponding to the pressure on the primary pulley set plus an offset value is controlled by the primary valve and the pressure selector valve that acts in a regulating way in that it increases the main pressure.

The offset mentioned represents a delivery pressure offset that can be added to the pressure on the primary pulley set if the operation of the primary valve so requires.

In the previous embodiments, for reasons of clarity the primary pulley set was associated with the first pulley set and the secondary pulley set with the second pulley set, since the hydraulic system of the invention can appropriately also be designed in that way.

In principle, however, the invention can be implemented when the first pulley set is the secondary pulley set and the second pulley set is the primary pulley set. The pulley ratio and the control strategies for transmission and contact pressure regulation can be correspondingly adapted without great cost or effort.

The hydraulic system according to the invention can be used with various CVT transmission structures, with individual chamber variators including tandem piston variators.

BRIEF DESCRIPTION OF THE DRAWING

The invention will now be described, by way of example, with reference to the accompanying drawings in which.

DETAILED DESCRIPTION OF THE INVENTION

Figure 1:
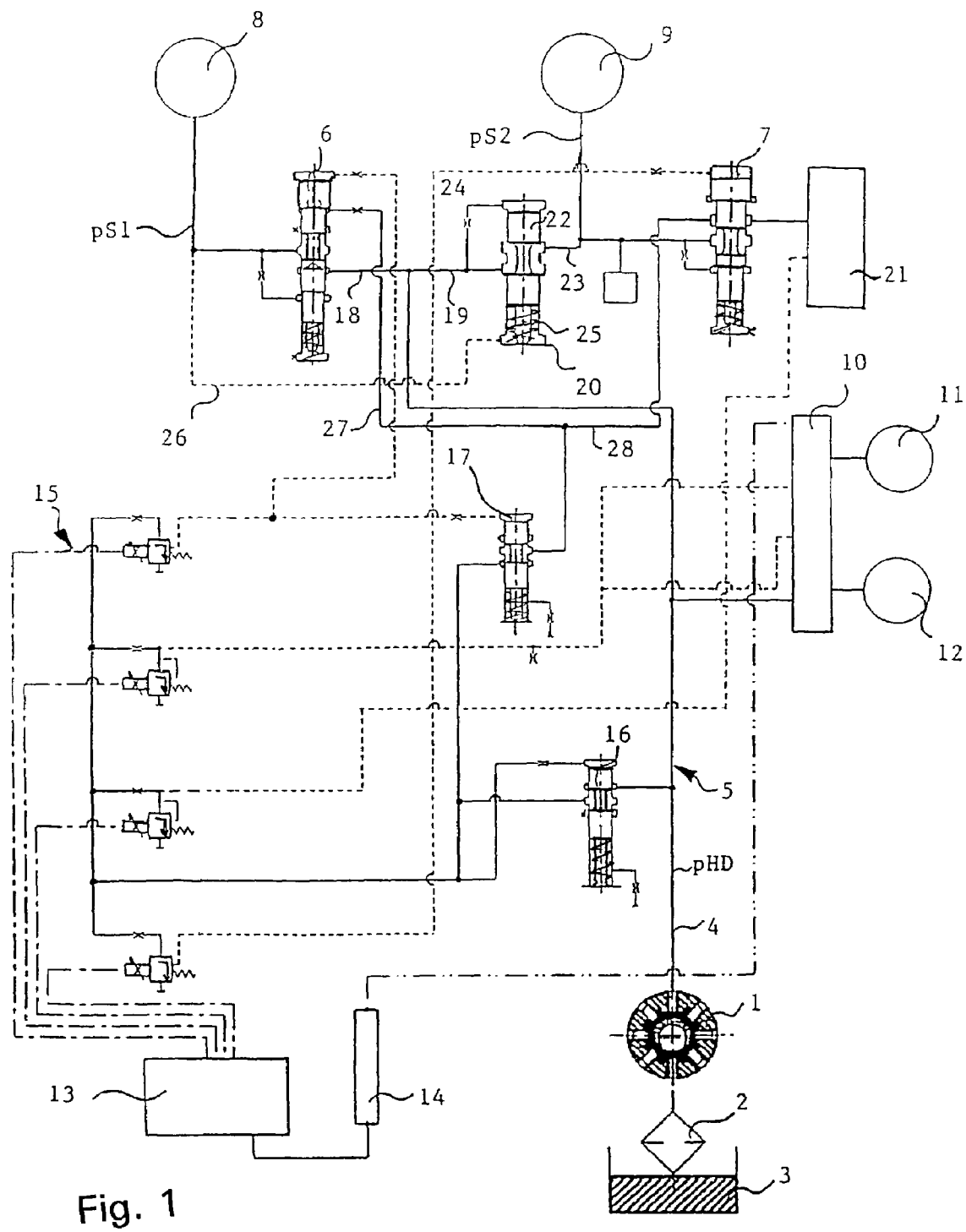
FIG. 1 illustrates a hydraulic system of a CVT automatic transmission in simplified schematic form.

The single figure of the drawing shows in greatly simplified form a control layout of a hydraulic system for a CVT automatic transmission of a motor vehicle. In this, oil is drawn from an oil sump 3 by an oil pump 1 designed as a radial piston pump, via an oil filter device 2 designed as a suction filter. The oil is delivered at a main pressure pHD in a main pressure line 4 first to a primary circuit 5.

Via valve mechanisms 6, 20 and 7 the primary circuit 5 leads to a first pulley set 8 and a second pulley set 9 of a variator of the CVT transmission not illustrated in detail.

In the embodiment shown, the first pulley set 8 is a primary pulley set fitted on a drive input shaft or primary shaft, and the second pulley set 9 is a secondary pulley set fitted on a drive output or secondary shaft.

In addition, via only schematically indicated valve mechanisms 10, the primary circuit 5 feeds switching elements of which a brake coupling 11 and a coupling 12 for driving forwards are represented symbolically.

The hydraulic control of the pulley sets 8, 9 and the switching elements 11, 12, as also that of the other elements that regulate the oil supply, take place via signals from an electronic transmission control system 13 formed in a manner known in itself and associated with a position lever 14 for setting gear positions such as "P" for parking of the vehicle, "R" for reversing, "N" for neutral and "D" for driving forwards, with other gear positions if needs be.

The electronic transmission control 13 is connected via various leads to a pressure regulation cascade 15 associated via a pressure reduction valve 16 with the primary circuit 5 and which regulates the control pressure for any valves that have to be controlled.

Of central importance is the pressure supply to the pulley sets 8, 9 of the variator. As can be seen from the drawing, the main pressure line 4 divides in the area of the variator into a line 18 leading to a primary valve 6 that controls the pressure pS1 at the primary pulley set 8, and another line 19 leading to a secondary valve 7 that controls the pressure pS2 at the secondary pulley set 9.

To secure the oil supply of the variator, a line 17 from an emergency valve 17 connected with the pressure regulation cascade 15 leads to the primary valve 6, and a line 28 leads to the secondary valve 7.

Positioned before the secondary valve 7 is a pressure selector valve 20 whose position determines whether it is the secondary valve 7 or the primary valve 6 together with the pressure selector valve 20 by which the main pressure pHD to be delivered from the oil pump 1 is controlled.

Connected to the secondary valve 7 is a secondary circuit 21, which in a known way comprises a cooler, lubrication and other consumers. For this, the secondary circuit 21 is supplied with oil from excess oil volumes at the secondary valve 7, the said oil being tapped off into the secondary circuit 21.

In the preferred embodiment illustrated, the pressure selector valve 20 is constructed as a slide-valve comprising a valve piston 22 which can be controlled such that it regulates a connection between the line 19 leading to the primary valve 6 and the oil pump 1, and a line 23 leading to the secondary valve 7 and the secondary pulley set 9, between an opening and closing position. For this purpose, the valve piston 22 is connected at one end, via a throttle 24, to the line 19 leading to the oil pump 1 and the primary valve 6. At the opposite end of the valve piston 22 is arranged a spring 25 which, together with the pressure pS1 fed in via a control line 26, act upon the valve piston 22, pS1 being the pressure acting on the primary pulley set 8.

The design of the pressure selector valve 20 is such that when a pressure pS2 is to be set at the secondary pulley set 9 that is higher than or at least equal to the pressure pS1 at the primary pulley set 8 plus an offset value, it is pushed to an end-stop position which opens up the connection from the main pressure line 7 to the secondary valve 7, so that the secondary valve 7 controls the main pressure pHD delivered by the oil pump 1. Thus, in this case the pressure selector valve 20 is not involved in any regulatory action.

In the case when the pressure pS1 at the primary pulley set 8 plus an offset, which can for example be between 3 and 7 bar, is higher than the pressure pS2 at the secondary pulley set, the valve piston 22 of the pressure selector valve 20 leaves its end-stop position and moves along a guiding edge until the connection between the main pressure line 4 and the secondary valve 7 is at least nearly cut off. Now, the same pressure acts upon the primary valve 6 and the pressure selector valve 20, and as a result the main pressure pHD to be delivered is in this case controlled by the primary valve 6 and the pressure selector valve 20. In this case the offset can be adjusted by virtue of the prestress in the spring 25 in the pressure selector valve 20.

REFERENCE NUMERALS

1 Oil pump
2 Oil filter device, suction filter
3 Oil sump
4 Main pressure line
5 Primary circuit
6 Valve mechanism, first valve
7 Valve mechanism, second valve
8 First pulley set
9 Second pulley set
10 Valve mechanisms
11 Switching element, brake coupling
12 Switching element, coupling for driving forward
13 Electronic transmission control
14 Positioning lever
15 Pressure regulation cascade
16 Pressure regulation valve set
17 Emergency valve
18 Line
19 Line
20 Pressure selector valve
21 Secondary circuit
22 Valve piston
23 Line
24 Partition
25 Spring
26 Control line
27 Line
28 Line
pHD Main pressure
pS1 Pressure at the first pulley set (primary pulley set)
pS2 Pressure at the second pulley set (secondary pulley set)

What is claimed is:

1. A hydraulic system of a CVT transmission for a motor vehicle comprising a variator having a first pulley set (8) and a second pulley set (9), the hydraulic system comprising:
    an oil pump (1) to convey oil from an oil slump (3) through a main supply line (5) at a main hydraulic supply pressure (pHD) to a first valve supply line (18) and a second valve supply line (23);
    a first valve mechanism (6) is supplied with oil via the first valve supply line (18) to effect a respective first pressure (pS1) acting on the first pulley set (8), and a second valve mechanism (7) is supplied with oil via the second valve supply line (23) to effect a respective second pressure (pS2) acting on the second pulley set (9); and
    wherein a pressure selector valve (20) is connected between the main supply line (5) and the second valve mechanism (7) to regulate the main hydraulic supply pressure (pHD) between the first valve mechanism (6) and the second valve mechanism (7).

2. The hydraulic system according to claim 1, wherein one of a) the first pulley set forms a primary pulley set (8) and the second pulley set forms a secondary pulley set (9) of the variator and, b) the first pulley set forms the secondary pulley set and the second pulley set the primary pulley set.

3. The hydraulic system according to claim 1, wherein the pressure selector valve (20) is a slide-valve, connected in a hydraulic line (19) between the oil pump (1) and the first valve mechanism (6) to control the pressure (pS1) reaching the first pulley set (8), and a hydraulic line (23) leading to the valve mechanism (7) to control the pressure (pS2) reaching the second pulley set (9), is controlled by a valve piston (22) connected at one end via a throttle (24) to the hydraulic line (19) leading to the oil pump (1) and the valve mechanism (6) of the first pulley set (8), while an opposite end of the valve piston (22) is acted upon by a spring (25) and by the pressure (pS1) acting upon the first pulley set (8).

4. The hydraulic system according to claim 1, wherein the main pressure (pHD) corresponds to the pressure (pS2) on the second pulley set (9) when the pressure (pS2) reaching the second pulley set (9) is no less than the pressure (pS1) reaching the first pulley set (8) plus an optional offset value, and the main pressure (pHD) corresponds to the pressure (pS1) on the first pulley set (8), plus an optional offset value, when the pressure (pS2) on the second pulley set (9) is smaller than the pressure on the first pulley set (8), plus the optional offset value.

5. The hydraulic system according to claim 4, wherein the arrangement of the first valve mechanism (6), the second valve mechanism (7), and the pressure selector valve (20) is such that the main pressure (pHD) corresponding to the pressure (pS2) reaching the second pulley set (9) is controlled by the second valve mechanism (7), and the main pressure (pHD) corresponding to the pressure (pS1) reaching the first pulley set (8), plus the optional offset pressure, is controlled by the first valve mechanism (6) by the pressure selector valve (20).

6. The hydraulic system according to claim 4, wherein the main hydraulic supply line (5) feeds the main pressure (pHD) to at least one of the variator and switching elements (11, 12), and a second hydraulic circuit (21) is provided for supplying oil to other consumers, and the second hydraulic circuit (21) is connected to the main hydraulic supply line (5) via the second valve mechanism (7).

7. A hydraulic system of a CVT transmission for a motor vehicle comprising a variator having a first pulley set (8) and a second pulley set (9), the hydraulic system comprising:
    an oil pump (1) to convey oil from an oil sump (3) through a main supply line (5) at a main hydraulic supply pressure (pHD) to a first valve supply line (18) and a second valve supply line (23);
    a first valve mechanism (6) is supplied with oil via the first valve supply line (18) to effect a respective first pressure (pS1) acting on the first pulley set (8), and a second valve mechanism (7) is supplied with oil vial the second valve supply line (23) to effect a respective second pressure (pS2) acting on the second pulley set (9);
    a pressure selector valve (20) is connected between the main supply line (5) and the second valve mechanism (7) to regulate the main hydraulic supply pressure (pHD) between the first valve mechanism (6) and the second valve mechanism (7); and
    wherein the pressure selector valve (2)) has an open position when the second pressure (pS2) is equal to or higher than the first pressure (pS1) plus an offset value to allow the second valve mechanism (7) to control the main supply pressure (pHD), and a substantially closed position when the second pressure (pS2) is lower than the first pressure (pS1) plus the offset value to allow the first valve mechanism (6) to control the main supply pressure (pHD).

8. The hydraulic system according to claim 7, wherein one of a) the first pulley set forms a primary pulley set (8) and the second pulley set forms a secondary pulley set (9) of the variator and, b) the first pulley set forms the secondary pulley set and the second pulley set the primary pulley set.

9. The hydraulic system according to claim 7, wherein the pressure selector valve (20) is a slide-valve, connected in a hydraulic line (19) between the oil pump (1) and the first valve mechanism (6) to control the pressure (pS1) reaching the first pulley set (8), and a hydraulic line (23) leading to the valve mechanism (7) to control the pressure (pS2) reaching the second pulley set (9), is controlled by a valve piston (22) connected at one end via a throttle (24) to the hydraulic line (19) leading to the oil pump (1) and the valve mechanism (6) of the first pulley set (8), while an opposite end of the valve piston (22) is acted upon by a spring (25) and by the pressure (pS1) acting upon the first pulley set (8).

10. The hydraulic system according to claim 9, wherein the arrangement of the first valve mechanism (6), the second valve mechanism (7), and the pressure selector valve (20) is such that the main pressure (pHD) corresponding to the pressure (pS2) reaching the second pulley set (9) is controlled by the second valve mechanism (7), and the main pressure (pHD) corresponding to the pressure (pS1) reaching the first pulley set (8), plus the optional offset pressure, is controlled by the first valve mechanism (6) by the pressure selector valve (20).

11. The hydraulic system according to claim 9, wherein the main hydraulic supply line (5) feeds the main pressure (pHD) to at least one of the variator and switching elements (11, 12), and a second hydraulic circuit (21) is provided for supplying oil to other consumers, and the second hydraulic circuit (21) is connected to the main hydraulic supply line (5) via the second valve mechanism (7).

12. The hydraulic system according to claim 7, wherein the main pressure (pHD) corresponds to the pressure (pS2) on the second pulley set (9) when the pressure (pS2) reaching the second pulley set (9) is no less than the pressure (pS1) reaching the first pulley set (8) plus an optional offset value, and the main pressure (pHD) corresponds to the pressure (pS1) on the first pulley set (8), plus an optional offset value, when the pressure (pS2) on be second pulley set (9) is smaller than the pressure on the first pulley set (8), plus the optional offset value.

* * * * *